US011969749B2

(12) United States Patent
Simonsen

(10) Patent No.: US 11,969,749 B2
(45) Date of Patent: Apr. 30, 2024

(54) METHOD FOR COATING PARTS

(71) Applicant: EJOT GmbH & Co. KG, Bad Berleburg (DE)

(72) Inventor: Fabian Simonsen, Erfurt (DE)

(73) Assignee: EJOT GmbH & Co. KG, Bad Berleburg (DE)

( * ) Notice: Subject to any disclaimer, the term of this patent is extended or adjusted under 35 U.S.C. 154(b) by 282 days.

(21) Appl. No.: 17/455,381

(22) Filed: Nov. 17, 2021

(65) Prior Publication Data

US 2022/0072583 A1 Mar. 10, 2022

Related U.S. Application Data

(63) Continuation of application No. PCT/EP2020/063730, filed on May 15, 2020.

(30) Foreign Application Priority Data

May 17, 2019 (DE) ......................... 102019113189.8

(51) Int. Cl.
*B05D 1/18* (2006.01)
*B05D 1/00* (2006.01)

(52) U.S. Cl.
CPC ............... *B05D 1/005* (2013.01); *B05D 1/18* (2013.01)

(58) Field of Classification Search
CPC ...................................................... B05D 1/005
See application file for complete search history.

(56) References Cited

FOREIGN PATENT DOCUMENTS

| | | |
|---|---|---|
| CN | 206286130 | 6/2017 |
| DE | 2345727 | 3/1975 |
| DE | 19613927 | 11/1997 |
| DE | 29911753 | 11/2000 |
| DE | 102017118172 | 2/2019 |
| EP | 0336983 | 10/1989 |
| EP | 1518608 | 3/2005 |
| TW | M463614 | 10/2013 |

(Continued)

OTHER PUBLICATIONS

TW M463614U English translation (Year: 2023).*
(Continued)

*Primary Examiner* — Hai Y Zhang
(74) *Attorney, Agent, or Firm* — Burris Law, PLLC

(57) ABSTRACT

A method for coating parts in a dip-spin process includes dipping the parts to be coated a coating liquid and spinning the parts in a planetary centrifuge in at least a first planetary basket arrangement and a second planetary basket arrangement, which each provide a maximum receiving volume. The planetary centrifuge includes a main rotor rotating about a main rotor axis of rotation. The at least two planetary basket arrangements rotate about their planetary axes of rotation, wherein the planetary axes of rotation are arranged on the main rotor spaced from the main rotor axis of rotation. The first planetary basket arrangement is rotated about its respective planetary axis of rotation in the opposite direction to the second planetary basket arrangement during centrifugation, and the filling of the receiving volume is carried out at up to 50% of the maximum receiving volume of the planetary basket arrangement.

8 Claims, 2 Drawing Sheets

(56) References Cited

FOREIGN PATENT DOCUMENTS

Figure 1:
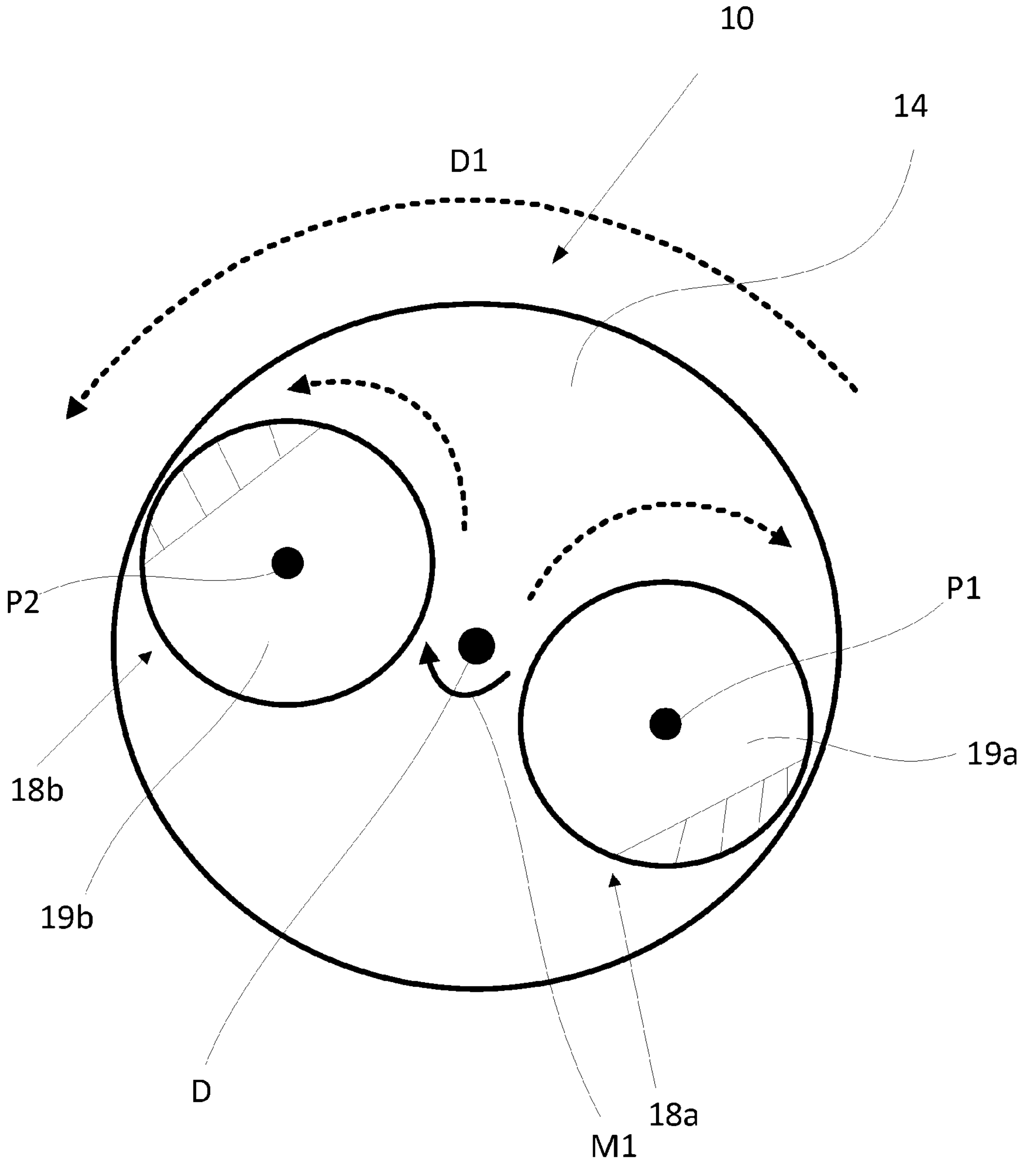

| | | | | |
|---|---|---|---|---|
| TW | M463614 U | * | 10/2013 | ............... B05C 9/00 |
| WO | 2019215343 | | 11/2019 | |

OTHER PUBLICATIONS

International Search Report for International Application PCT/EP2020/063730, dated Aug. 10, 2020.

Grehn et al., Extract from Metzler Physik, 1998, 3 pgs, Schroedel Verlag GmbH, Hannover, DE.

* cited by examiner

METHOD FOR COATING PARTS

CROSS-REFERENCE TO RELATED APPLICATIONS

This application is a continuation of International Application No. PCT/EP2020/063730, filed on May 15, 2020, which claims priority to and the benefit of DE 10 2019 113 189.8, filed on May 17, 2019. The disclosures of the above applications are incorporated herein by reference.

FIELD

The present disclosure relates to a method for coating parts in a dip-spin process.

BACKGROUND

The statements in this section merely provide background information related to the present disclosure and may not constitute prior art.

DE 299 11 753 U1 relates to a machine for surface treatment and/or surface coating of small parts, wherein the machine has a motor axis of rotation, at a distance from which a basket can be driven in rotation about its basket axis. The drive is effected via a planetary gearing. Due to the superimposed rotary motion, the parts received in the basket are subjected to alternating radial accelerations, which results in the spinning off of coating liquid and desired turnover behavior.

For the centrifuging of coating liquid, especially of small parts or scooping structures, it is advantageous to only partially fill the baskets which receive the parts, so that a desired mixing can be achieved. In this case, however, the known arrangement is only operable for small quantities of parts, or for operation with a relatively low centrifugal mass, since a high torque is generated in the case of intensive loading, so that a rotation of the basket about its basket axis is no longer possible and a large imbalance is generated.

SUMMARY

This section provides a general summary of the disclosure and is not a comprehensive disclosure of its full scope or all of its features.

The present disclosure provides a method of surface coating parts which enables improved loading.

According to the present disclosure, the parts to be coated are immersed in a coating liquid. The parts to be coated are subsequently spun in at least two planetary basket arrangements, in a first planetary basket arrangement and a second planetary basket arrangement. Each of the first planetary basket arrangement and the second planetary basket arrangement provides a maximum receiving volume. Filling of the receiving volume with parts is only performed up to a maximum of 50% of the maximum receiving volume of the at least two planetary basket arrangements.

The coated parts are spun in the at least two planetary basket arrangements in a planetary centrifuge, wherein the planetary centrifuge comprises a main rotor rotating about a main rotor axis of rotation, and the at least two planetary basket arrangements rotate about their planetary axis of rotation. The planetary axes of rotation are arranged on the main rotor at a distance from the main rotor axis of rotation. In the planetary centrifuge according to the present disclosure, the rotations about the main rotor axis of rotation and the planetary axis of rotation may not always be generated by a planetary gearing. Rather, a separate drive may be provided for each planetary basket arrangement which is different to the drive of the main rotor. In one aspect, the planetary rotation axes are arranged parallel to each other and parallel to the main rotor axis. The first planetary basket arrangement is rotated about its respective planetary rotation axis in the opposite direction to the second planetary basket arrangement during the spinning process.

The counter-rotation of the two planetary basket arrangements results in increased torque, which is due to the load distribution of the partially loaded planetary basket arrangements when rotating about the respective planetary axes of rotation; however, due to the counter-rotation of the planetary basket arrangements the restoring torque acting about the main rotor axis of rotation can be reduced.

Surprisingly, although the method of the present disclosure results in an unbalance torque on the main axis of rotation, the total sum of restoring torque and unbalance torque is reduced compared to a rotation in the same direction with a partial loading of the at least two planetary basket arrangements.

According to one form of the present disclosure, a centrifuge is used which provides a plurality of planetary basket arrangements arranged in pairs, wherein the two planetary basket arrangements are rotated in opposite directions to each other. In one variant, the axes of rotation of the planetary basket arrangements of a pair are aligned and symmetrical with respect to the main rotor axis of rotation. Thus, a simple speed control and a high reproducibility can be achieved. Equal treatment of the parts with respect to the respective planetary basket arrangements can also be provided. A planetary basket arrangement may comprise a planetary basket, in particular a cylindrical planetary basket, in which the parts are received, wherein the planetary axis of rotation is identical to the planetary basket axis. Alternatively, the planetary basket arrangements can be designed in such a way that a plurality of planetary baskets, in which the parts are accommodated, rotate about the respective planetary axes of rotation. In particular, the planetary axis of rotation is located between the individual planetary baskets.

The individual planetary baskets may be mechanically connected to each other. The planetary baskets can be rigidly connected to each other.

In another form of the present disclosure, the planetary baskets have a circular cross-section and lie with their walls disposed against each other, with the planetary axis of rotation being located at the center of the area resulting from the connection of the adjacent centers of the planetary baskets.

Such a configuration reduces the torque acting about the planetary axis of rotation in the direction opposite to the direction of rotation of the planetary basket arrangement, i.e. a restoring torque, thereby reducing both the unbalance torque on the main rotor axis and the overall restoring torques acting in the system.

By operating a planetary centrifuge in this way in a coating process, an increase in the total load can be achieved, and yet the total torque can remain within a range that can be reasonably controlled.

In some aspects, the number of planetary baskets is odd, and may be three. In further aspects, the planetary baskets are cylindrical and of equal size.

The planetary baskets are filled with an equal mass of bulk material, so that a continuous reduction of the counter-torque acting against the direction of rotation of the planetary rotation axis is produced. The coating agent may be, for example, a liquid zinc flake coating or an aluminum flake coating.

The planetary basket arrangement has a radius of a circle enveloping the planetary baskets, the radius of which being less than the distance of the planetary rotation axis from the main rotor axis. In one form, the distance is approximately equal to this radius.

In some aspects of the present disclosure, the speed for the main rotor is less than 450 RPM (rotations per minute). In other aspects, the speed for the planetary basket arrangement is from 0.5 RPM to 5 RPM.

In this way, a mixing, in particular a change in position of the small elements during centrifuging can be provided.

The distance of the planetary rotation axes from the main rotor axis can be between 0.2 m and 1 m.

Further areas of applicability will become apparent from the description provided herein. It should be understood that the description and specific examples are intended for purposes of illustration only and are not intended to limit the scope of the present disclosure.

DRAWINGS

Figure 2:
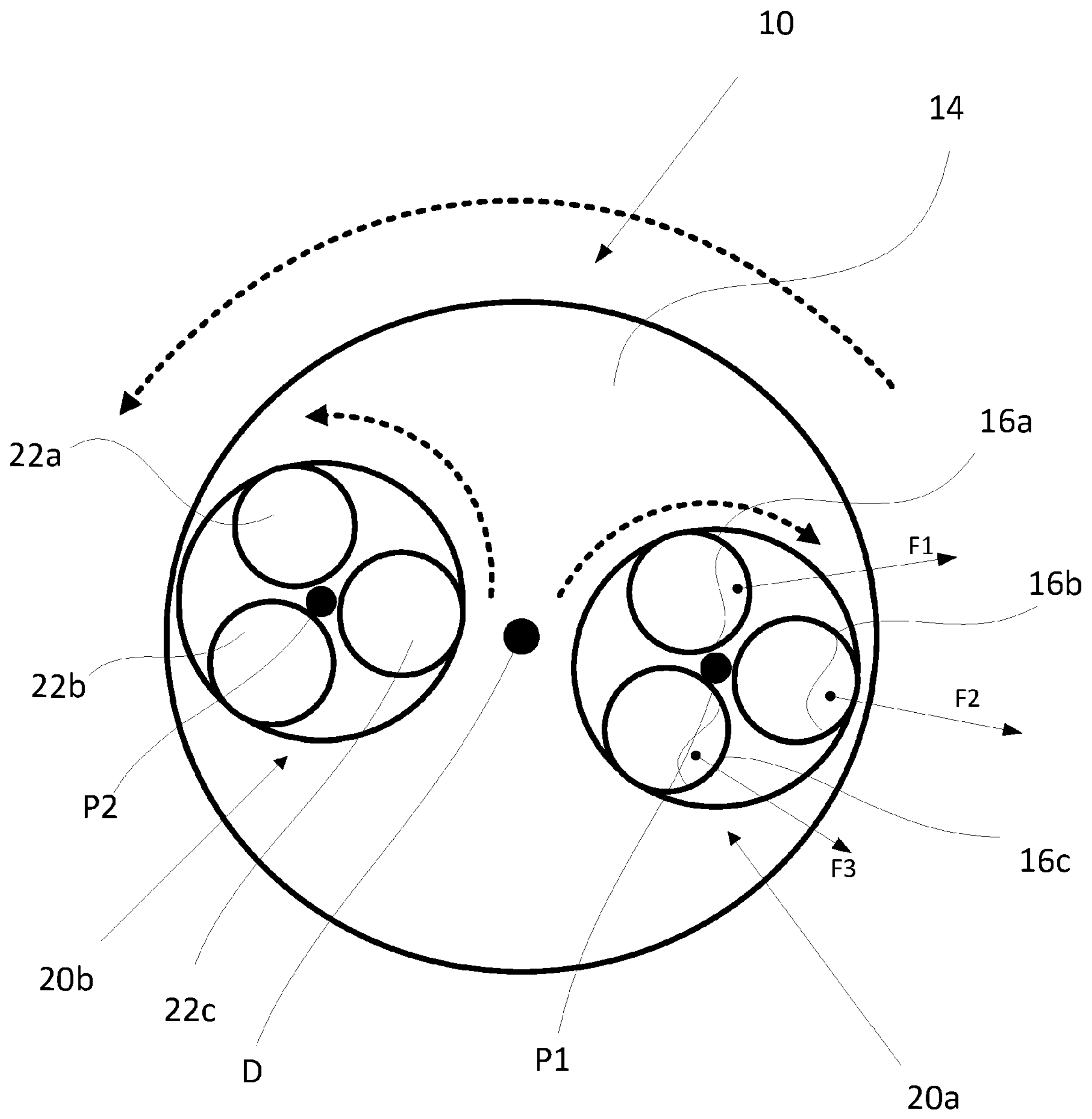

In order that the disclosure may be well understood, there will now be described various forms thereof, given by way of example, reference being made to the accompanying drawings, in which:

FIG. 1 is a top view of one form of a planetary centrifuge in its use according to the present disclosure; and FIG. 2 is a top view of another form of the planetary centrifuge in its use according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a planetary centrifuge 10 comprising a main axis of rotation D about which the main rotor 14 rotates in a first direction of rotation Dl. A first planetary basket arrangement 18*a* is provided eccentrically on the main rotor 14 and a second planetary basket arrangement 18*b* is provided symmetrically opposite the first planetary basket arrangement 18*a* with respect to the main axis of rotation D. The planetary basket arrangements 18*a*, 18*b* rotate about their respective planetary axes of rotation P1 and P2. The planetary basket arrangements 18*a*, 18*b* each comprise a cylindrical planetary basket 19*a*, 19*b* arranged coaxially with respect to the planetary axis of rotation P1, P2.

In this form of the present disclosure, the direction of rotation of the main rotor 14 is counterclockwise, whereas the direction of rotation of the first planetary basket arrangement 18*a* is oriented clockwise, and the direction of rotation of the second planetary basket arrangement 18*b* is oriented counterclockwise.

The rotational speed of the main rotor is about 300 RPM, and the rotational speed of the planetary basket arrangement 18*a*, 18*b* is about 1 RPM.

Due to the counter-rotation of the planetary basket arrangements, the restoring torque M1, which acts counter to the direction of rotation of the main rotor 14 about the main rotor axis of rotation, is reduced, resulting in an unbalance torque on the main axis of rotation D. The unbalance torque is significantly lower than the torque acting when the planetary basket arrangements rotate in the same direction about the main axis of rotation.

FIG. 2 shows another schematic view of a planetary centrifuge as used in the coating process according to the present disclosure. This form comprises, in addition to the arrangement described in FIG. 1, two planetary basket arrangements 20*a*, 20*b*, each having three planetary baskets 16*a*, 16*b*, 16*c*, 22*a*, 22*b*, 22*c*, which are rotated about the planetary axis of rotation P1, P2 of the respective planetary basket arrangement 20*a*, 20*b*.

In some aspects, all of the planetary baskets 16*a*, 16*b*, 16*c*, 22*a*, 22*b*, 22*c* are filled with the same or approximately the same amount of coated parts.

Thus, during centrifugation, forces F1, F2, F3 result for the planetary basket arrangement 20*a* due to the parts distributed in the planetary baskets 16*a*, 16*b*, 16*c*. The forces F2, F3 generate a moment against the direction of rotation, whereas F1 generates a moment in the direction of rotation. This significantly reduces the load on the drive motor for the rotation of the planetary basket arrangement 20*a*, 20*b* about the planetary rotation axis, allowing 360° rotation of the planetary basket arrangement. According to the method of the present disclosure, the planetary basket arrangements perform a rotation about their respective planetary axes of rotation P1, P2 by more than 360°, resulting in a mixing and position change of the parts to be coated. The walls of the planetary baskets 16*a*, 16*b*, 16*c*, 22*a*, 22*b*, 22*c* are configured such that the coating liquid can be discharged from the planetary baskets during centrifugation. In particular, the planetary baskets are designed as grid baskets.

The planetary basket arrangements 20*a*, 20*b*, each comprising three planetary baskets 16*a*, 16*b*, 16*c*, 22*a*, 22*b*, 22*c*, are rotated in opposite directions of rotation. This reduces the restoring torque acting about the main axis of rotation due to the counter-rotation, and the restoring torque acting about the planetary axes of rotation as well as the imbalance torque due to the plurality of planetary cages.

Overall, this use leads to torque ratios during the spinning process that can be implemented in terms of machine technology, even with effective quantities of parts.

By the method according to the present disclosure, the coating liquid can be reliably thrown off from the smallest scooping structures. This has the advantage, in particular in the case of small screw drives, that an excess coating in the drive does not counteract the ideal reception of the drive bit.

This can increase the throughput of parts to be processed in one coating operation.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A coating method for coating parts in an immersion centrifugal process using a planetary centrifuge comprising a main rotor rotatable about a main rotor axis of rotation, and at least two planetary basket arrangements, the at least two planetary basket arrangements including a first planetary basket arrangement rotatable about a first planetary axis of rotation and a second planetary basket arrangement rotatable about a second planetary axis of rotation, wherein the first planetary axis of rotation and the second planetary axis of rotation are each arranged on the main rotor spaced from the main rotor axis of rotation, and wherein each of the at least two planetary basket arrangements provide a maximum receiving volume, the coating method comprising:

filling parts into the at least two planetary basket arrangements such that a filling volume is at most 50% of the maximum receiving volume of each one of the at least two planetary basket arrangements;

immersing the parts contained in the at least two planetary basket arrangements into a coating liquid; and subsequently centrifuging the parts contained in the at least two planetary basket arrangements such that the main rotor rotates about the main rotor axis of rotation, the first planetary basket arrangement rotates about the first planetary axis of rotation, the second planetary basket arrangement rotates about the second planetary axis of rotation, and the first planetary basket arrangement rotates in an opposite direction to the second planetary basket arrangement.

2. The coating method according to claim 1, wherein the first planetary axis of rotation of the first planetary basket arrangement and the second planetary axis of rotation of the second planetary basket arrangement are parallel and symmetrical to the main rotor axis of rotation.

3. The coating method according to claim 1, wherein the at least two planetary basket arrangements of the planetary centrifuge each comprise a plurality of planetary baskets rotatably arranged about a planetary axis of rotation of the respective planetary basket arrangement.

4. The coating method according to claim 3, wherein the at least two planetary basket arrangements each comprise an odd number of planetary baskets.

5. The coating method according to claim 3, wherein the planetary centrifuge comprises a plurality of pairs of first planetary basket arrangements and a plurality of second planetary basket arrangements, wherein the first planetary basket arrangements and the second planetary basket arrangements of each one of said plurality of pairs of first and second planetary basket arrangements are rotated in opposite directions.

6. The coating method according to claim 1, wherein the main rotor is rotated with a speed of rotation about the main axis of rotation of less than 450 RPM during the centrifuging.

7. The coating method according to claim 1, wherein the first and second planetary basket arrangements are rotated about the first planetary axis of rotation and the second planetary axis of rotation, respectively, with a speed of rotation of between 0.5 RPM and 5 RPM during the centrifuging.

8. The coating method according to claim 1, wherein each of the at least two planetary basket arrangements is rotated by more than 360° about its respective planetary axis of rotation during the centrifuging.

* * * * *